United States Patent Office 3,580,942
Patented May 25, 1971

3,580,942
CHLOROSULPHONYL-TERT.-BUTYLISOCYANATE AND ITS PREPARATION
Dieter Arlt, Cologne-Buchheim, Germany, assignor to Farbenfabriken Bayer Aktiengesellschaft, Leverkusen, Germany
No Drawing. Filed June 18, 1968, Ser. No. 737,859
Claims priority, application Germany, June 21, 1967, F 52,748
Int. Cl. C07c *119/04*
U.S. Cl. 260—453  2 Claims

ABSTRACT OF THE DISCLOSURE 2-isocyanato-2,2-dimethyl-ethane-sulphonic acid chloride is prepared by reacting isobutylene and cyanogen chloride with chlorosulphonic acid or sulphur trioxide. This compound is suitable for the modification of polyurethanes, for reaction with reactive hydrogen containing compounds and it is particularly useful as a cross linking agent for photo lacquers.

---

This invention relates to an isocyanato alkane sulphonic acid chloride and a process for its preparation. More particularly this invention relates to 2-isocyanato-2,2-dimethyl-ethane-sulphonic acid chloride and the process for its preparation.

Previously it has not been possible to prepare isocyanato alkane sulphonic acid chlorides by the normally expected processes such as, for example, by phosgenation of corresponding amino-alkane sulphonic acids.

An object of this invention is to provide an isocyanato-alkane sulphonic acid chloride and a method for its preparation. A further object of this invention is to provide an isocyanato-alkane sulphonic acid chloride which may be useful for the modification of polyurethanes or for reaction with active hydrogen compounds. A further object of this invention is to provide 2-isocyanato-2,2-dimethyl-ethane-sulphonic acid chloride and a process for preparing the same.

The foregoing objects and others which will become apparent from the following description are accomplished in accordance with this invention, generally speaking, by providing 2-isocyanato-2,2-dimethyl-ethanesulphonic acid chloride by a process comprising reacting isobutylene and cyanogen chloride with chlorosulphonic acid or sulphur trioxide and then heating the reactants, for example, by distillation, and separating 2-isocyanato-2,2-dimethyl-ethane-sulphonic acid chloride.

The process according to the invention is illustrated by the following reaction schemes:

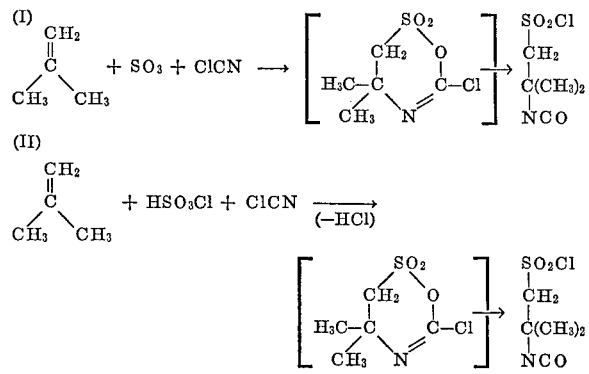

The primary reaction product shown in brackets in the reaction schemes, which is first obtained by reacting isobutylene and cyanogen chloride with chlorosulphonic acid or sulphur trioxide, is generally not isolated.

The process of this invention is generally carried out by using the starting components in equimolar ratios. However, one may preferably use an excess of cyanogen chloride, which then serves as a solvent. The reaction may, if desired, also be carried out in an inert solvent such as, for example, methylene chloride, sulphur dioxide tetrahydrofurane, carbontetrachloride, tetrachloroethylene and the like.

The starting components are reacted together at reaction temperatures of from about −30° C. to about +30° C. After the starting components have completely reacted any excess cyanogen chloride present and inert solvents, if present are removed from the reaction mixture, such as, for example, by distillation. A primary reaction product remains behind, which is then carefully heated. When chloro-sulphonic acid is used as a starting component, hydrogen chloride is split off, and on further heating, finally up to temperatures of about 170° C. to about 180° C., a mixture of 2-isocyanato-2,2-dimethyl-ethane sulphonic acid chloride and 2-methyl-propene-2-sulphonic acid chloride distills off in vacuo. The mixture can be separated by any suitable means, such as, for example, by fractional distillation in vacuo or the like.

The product of the process of this invention is a compound which finds wide application as an intermediate compound in isocyanate chemistry, such as, for example, for modification of polyurethanes or reaction in general, with compounds having reactive hydrogen atoms by methods known to those skilled in the art. Compounds modified in this way with the product of the process of the invention may, for example, be used as auxiliary agents for treating textiles also by methods known to those skilled in the art. The product of the process of the invention is especially useful as a cross-linker for photo lacquers. For this reason the product is transformed into the corresponding sulphazide and brought into the reaction with lacquer compositions which contain hydrogen atoms reactive against isocyanates and unsaturated bondings and cross-linking of these compositions is carried out by the action of light or radiation.

The invention is further illustrated but is not intended to be limited by the following examples in which all parts and percentages are by weight unless otherwise specified.

EXAMPLE 1

About 580 parts of chlorosulphonic acid are dissolved in about 750 ml. of cyanogen chloride at about 0° C. with stirring and cooling. About 300 parts of isobutylene are then introduced over the course of about 2 hours, the reaction mixture being kept at a temperature of from about 0° C. to about 5° C. during the reaction by cooling. The reaction mixture is then heated to from about 50° C. to about 60° C., and excess cyanogen chloride distills off with simultaneous vigorous evolution of hydrogen chloride. The product remaining behind is further heated in a vacuum of about 1 mm. Hg, a distillate passing over. The temperature is raised, as soon as distillation slows down, to a maximum of about 170° C. About 765 parts of a distillate which consists mainly of 2-isocyanato-2,2-dimethyl-ethane-sulphonic acid chloride and 2-methyl-propene-2-sulphonic acid chloride are obtained. About 450 parts, corresponding to about 46% of the theoretical, of 2-isocyanato-2,2-dimethyl-ethane-sulphonic acid chloride of boiling point 83° C. to 85°/0.2 mm. Hg are obtained by fractional vacuum distillation.

Analysis.—$C_5H_8ClNO_3S$ (197.7) Calculated (percent): C, 30.4; H, 4.1; Cl, 17.9; N, 7.1; O, 24.3; S, 16.2. Found (percent): C, 30.4; H, 4.2; Cl, 18.0; N, 7.1; O, 24.4; S, 16.0.

EXAMPLE 2

About 150 parts of cyanogen chloride and 56 parts of isobutylene are dissolved in about 200 ml. of methylene chloride. 160 parts of sulphur trioxide, dissolved in about 150 ml. of methylene chloride, are added dropwise to this solution with stirring and cooling to about 0° C., and about a further 56 parts of isobutylene are introduced at the same time. Excess cyanogen chloride and methylene chloride are distilled off, and the residue is decomposed by heating to about 130° C. in a vacuum. About 132 parts of distillate are obtained. This is separated by fractional vacuum distillation into 2-methyl-propene-2-sulphonic acid chloride and 2-isocyanato-2,2-dimethyl-ethane-sulphonic acid chloride. About 35 parts of the last mentioned compound are obtained corresponding to about 9% of the theoretical.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. 2 - isocyanato - 2,2-dimethyl-ethane-sulphonic acid chloride.

2. A process for the preparation of the compound of claim 1 comprising reacting at a temperature of from about −30° C. to about 30° C. isobutylene and cyanogen chloride with a member selected from the group consisting of chlorosulphonic acid and sulphur trioxide, heating the reaction mixture to a temperature of about 170° C. to about 180° C. and separating 2-isocyanato-2,2-dimethyl-ethane-sulphonic acid chloride.

References Cited

UNITED STATES PATENTS

| 3,235,549 | 2/1966 | Broussalian | 260—243 |
| 3,341,502 | 9/1967 | Pampus et al. | 260—453X |

FOREIGN PATENTS

| 1,102,798 | 2/1968 | Great Britain. |
| 1,171,887 | 6/1964 | Germany. |

OTHER REFERENCES

Bayer: Chemical Abstracts, vol. 51, p. 8141 (1957).

CHARLES B. PARKER, Primary Examiner

D. H. TORRENCE, Assistant Examiner

U.S. Cl. X.R.

8—115.5; 96—88; 204—159.22; 252—8.7; 260—77.5, 243, 349